United States Patent Office 3,359,260
Patented Dec. 19, 1967

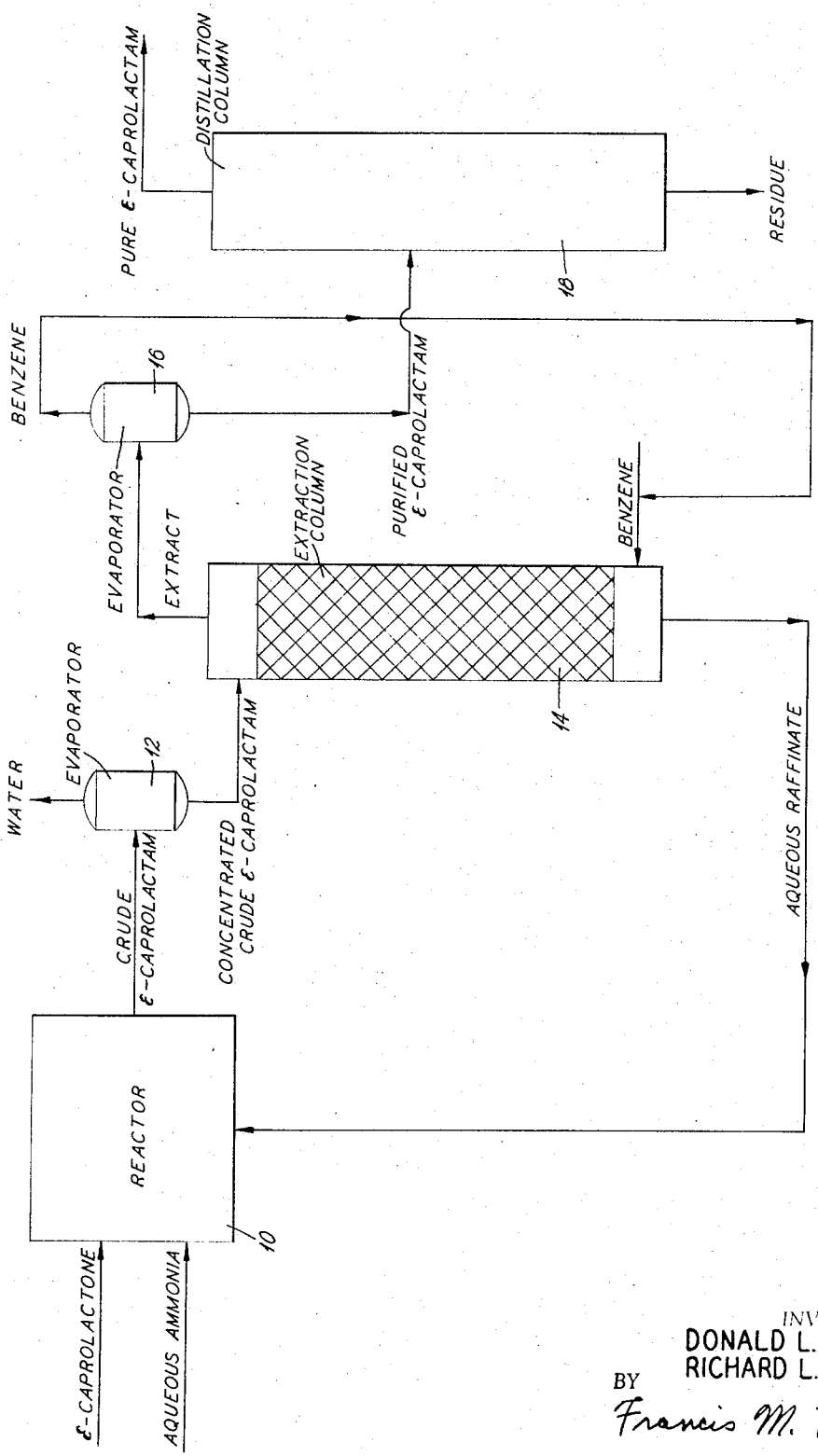

3,359,260
PURIFICATION OF EPSILON-CAPROLACTAMS
Richard L. Roberts, Milton, and Donald L. MacPeek, South Charleston, W. Va., assignors to Union Carbide Corporation, a corporation of New York
Filed Dec. 30, 1964, Ser. No. 422,140
11 Claims. (Cl. 260—239.3)

ABSTRACT OF THE DISCLOSURE

In a process for production of an epsilon-caprolactam by ammonolysis of a 6-hydroxycaproic acid derivative in an aqueous medium at superatmospheric pressure and elevated temperature, extraction with an aromatic solvent such as, for example, benzene, toluene, or xylene, is utilized to recover the epsilon-caprolactam in pure form from the crude aqueous reaction product.

---

This invention relates in general to the production of epsilon-caprolactams and specifically to the recovery of epsilon-caprolactams in purified form from the crude aqueous solutions that are produced in the formation of epsilon-caprolactams by ammonolysis of derivatives of 6-hydroxycaproic acid.

It has been known for some years that major advantages in large scale commercial production of epsilon-caprolactam can be achieved by use of processes in which the epsilon-caprolactam is produced from a derivative of 6-hydroxycaproic acid, such as 6-acetoxycaproic acid, 6-hydroxycaproamide or epsilon-caprolactone, as contrasted with the conventional process for production of epsilon-caprolactam by Beckmann rearrangement of cyclohexanone oxime. Such processes are applicable not only to production of epsilon-caprolactam itself but also, for example, to production of alkyl substituted epsilon-caprolactams and N-alkyl-epsilon-caprolactams and a variety of 6-hydroxycaproic acid derivatives have been disclosed as useful starting materials. Among the patents which exemplify this technology there can be mentioned United States Patents 3,000,877, 3,000,878, 3,000,879 and 3,000,-880, all of which are incorporated herein by reference. Regardless of the particular starting material employed, the reaction is conducted in an aqueous medium at superatmospheric pressures and elevated temperatures and the reaction product is a crude aqueous solution containing a large number of by-products from which purified epsilon-caprolactam must be recovered. A critical aspect of any such process operated on a commercial scale is the means employed for recovering the epsilon-caprolactam in pure or relatively pure form.

In the prior art processes referred to above, the reaction product is a complex equilibrium mixture containing, in addition to the desired epsilon-caprolactam and any unreacted starting material, such materials as poly(epsilon-caprolactam), poly(epsilon-caprolactone), 6-hydroxycaproic acid, 6-hydroxycaproamide, 6-acetoxycaproic acid, epsilon - aminocaproamide, epsilon-aminocaproic acid, and the like. All such reaction by-products are convertible to epsilon-caprolactam and, accordingly, to obtain high yields of the desired product they must be recycled to the reactor after removal of the product therefrom. Recovery of the epsilon-caprolactam in pure form from the complex equilibrium mixture has proved to be a very difficult problem. Prior art methods for such recovery have involved a series of distillations or, more usually, extraction with a halogenated solvent, such as chloroform, as a first step with subsequent completion of the purification by distillation techniques. The prior art method of extraction with a halogenated solvent has not proven commercially feasible and it is to this specific aspect of the process that the present invention is directed.

The essential requirements for an effective extractant for the purpose disclosed herein are three in number. First, the extractant must be capable of extracting the epsilon-caprolactam from the crude reaction product mixture without extracting the closely related by-products which are to be recycled to the reactor. Second, the extractant must have a very low solubility in water since it is desired to recover the epsilon-caprolactam from the aqueous solution without unduly contaminating the solution with extractant. Finally, the extractant must be inert under the conditions of the reaction since small amounts of extractant will inevitably be recycled to the reactor along with the aqueous extraction raffinate. The halogenated solvents of the prior art are water-insoluble and are effective in extracting epsilon-caprolactam from the equilibrium product mixture without removing by-products which are to be recycled to the reactor. However, they suffer from a serious disadvantage in that under the high temperature, high pressure conditions of the reaction they form halide salts, for example, ammonium chloride, which cause very severe corrosion problems. These salts tend to accumulate in the raffinate and, in addition to the hazards of greatly increased corrosion, may eventually lead to plugging of lines and equipment. It is accordingly seen that the halogenated solvents of the prior art do not meet the three criteria for an effective extractant in this particular application and are undesirable for use in a commercial process.

It has now been discovered that a specific group of aromatic solvents will function as effective extractants for the recovery of epsilon-caprolactams from crude aqueous solutions thereof. The solvents which have been found to be of utility for the purposes of this invention are aromatic solvents of 6 to 12 carbon atoms of the general formula:

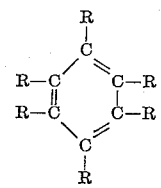

wherein each R is independently selected from the group consisting of hydrogen and lower alkyl radicals of 1 to 4 carbon atoms. As is evident from inspection of the general formula given above, the ring may be substituted by up to six alkyl groups and any particular alkyl group may contain up to four carbon atoms but the number and size of the alkyl substituents is limited by the requirement that the molecule contain not more than 12 carbon atoms in all. Illustrative of the suitable aromatic solvents one can mention benzene, toluene, o-xylene, m-xylene, p-xylene, mesitylene, isodurene, ethylbenzene, n-propylbenzene, cumene, n-butylbenzene, t-butylbenzene, p-cymene, 1,3,5-triethylbenzene, and the like. These solvents may be used alone or mixtures of two or more of them may be employed if desired. Because of their low cost and particularly effective performance, it is preferred to employ benzene, toluene or xylene as the extractant and particularly preferred to employ benzene. It was surprising to find that these common aromatic solvents function in an effective manner under the unusually severe requirements of the process. In contrast with the halogenated solvents of the art they are completely inert under the conditions of the reaction so problems due to salt formation are eliminated. In contrast with other common halogen-free solvents, such as, for example, 2-methyl pentane, n-hexyl ether, n-heptane and cyclohexane, they are capable of extracting epsilon-caprolactam in effective degree from the complex mixture produced by the reaction.

The present invention accordingly provides an improved method of recovering a purified epsilon-caprolactam from a crude aqueous solution thereof which is applicable to any of the prior art processes involving ammonolysis of a 6-hydroxycaproic acid derivative to an epsilon-caprolactam in aqueous media at superatmospheric pressures and elavated temperatures. In accordance with this improved method, the purified epsilon-caprolactam is recovered by contacting the crude aqueous solution with an extractant of the formula disclosed hereinabove, then the epsilon-caprolactam is separated from the extractant by, for example, evaporation of the extractant, and finally, a further purification of the epsilon-caprolactam is effected, if necessary, by distillation or other conventional means. The compounds which, in accordance with the teachings of the prior art, can be employed as starting materials in the process to which the extraction method of this invention relates include, among others, 6-acetoxycaproic acid and its lactone adducts, 6-hydroxycaproamide, alkyl substituted 6-hydroxycaproamides, epsilon-caprolactone, and alkyl substituted epsilon-caprolactones, and the term "6-hydroxycaproic acid derivative" as employed herein and in the appended claims is intended to include all such starting materials. Epsilon-caprolactams prepared by these processes include epsilon-caprolactam, alkyl substituted epsilon-caprolactams such as alpha-methyl-epsilon-caprolactam or alpha, beta-dimethyl-epsilon-caprolactam, and N-alkyl-epsilon caprolactams such as N-methyl-epsilon-caprolactam or N-butyl-epsilon-caprolactam, and the terms "epsilon-caprolactam" and "epsilon-caprolactams" as employed herein and in the appended claims are intended to mean, as the context requires, any or all of such compounds.

The conditions under which the extraction can be carried out in accordance with this invention are not narrowly critical. The optimum volumetric ratio of extractant to equeous reaction product mixture will depend upon the concentration of the desired epsilon-caprolactam therein and upon such factors as the number of extraction stages and the temperature and pressure under which the extraction equipment is operated. Generally the volumetric ratio of extractant to aqueous reaction product mixture employed will be from about 1 to 1 to about 20 to 1 and preferably it will be in the range from about 5 to 1 to about 15 to 1. The extraction can be carried out at temperatures of from about 0° C., or less to about 200° C., or more, and pressures of from about 0 p.s.i.g. to about 250 p.s.i.g., or more, with the proviso that the temperature and pressure are so selected within these ranges for a particular extractant as to maintain the extractant in liquid phase.

In accordance with the present invention, the extraction of the epsilon-caprolactam from the crude aqueous reaction product can be carried out in a batchwise or continuous manner but is preferably conducted as a continuous countercurrent liquid-liquid extraction. Thus, the crude aqueous solution of epsilon-caprolactam is preferably continuously fed to the top of an extraction column while the extractant is continuously fed to the bottom of the column. It is particularly preferred that the crude aqueous reaction product effluent from the reactor be concentrated prior to feeding it to the extraction column, i.e. that a substantial portion of the water be removed therefrom. This may be accomplished in any suitable manner, such as by the use of an evaporator. Since the solubility of epsilon-caprolactams in water is such that very concentrated solutions can be prepared and since an increase in concentration will invariably result in an increase in extraction efficiency, the extent to which the crude aqueous reaction product should be concentrated prior to the extraction step is dictated primarily by economic considerations and fluid flow limitations. In turn, the optimum number of stages for the extraction column will depend upon the extent to which such concentration is carried out as well as other factors such as the temperature, the pressure, the ratio of extractant to aqueous feed, and so forth. Generally from about 3 to about 20 stages will be found to be appropriate.

The accompanying drawing illustrates a particular embodiment of the present invention. As shown in the drawing, epsilon-caprolactone and aqueous ammonia are fed to reactor 10 operating at superatmospheric pressure and elevated temperature, for example a pressure and temperature within the ranges disclosed in United States Patent 3,000,880. The crude aqueous reaction product effluent from reactor 10 is fed to evaporator 12, wherein about 50 weight percent of the water contained therein is removed, and thence to the top of packed extraction column 14, operating at a temperature of, for example, 50° C. Benzene is fed continuously to the base of extraction column 14 in an amount sufficient to provide a volumetric ratio of benzene to feed of 5 to 1. An aqueous raffinate stream is withdrawn continuously from the bottom of extraction column 14 and a benzene extract stream is withdrawn continuously as an overhead product, with the column being operated so as to maintain the packed section full of a continuous aqueous phase. The aqueous raffinate, which contains the reaction by-products such as 6-hydroxycaproamide, is recycled to reactor 10 while the benzene extract, which contains the epsilon-caprolactam, is fed to evaporator 16. In evaporator 16 the excess benzene is removed by evaporation, whereupon it is collected and recycled to the bottom of extraction column 14, and then the purified epsilon-caprolactam rich stream from the bottom of evaporator 16 is fed to distillation column 18 where it is further refined. One or more additional distillation columns may be operated in series with distillation column 18, if desired, to ultimately yield a highly pure epsilon-caprolactam product. Alternately, the final purification step may be accomplished by recrystallization, or other conventional means, rather than distillation.

The following examples are provided for the purpose of further illustrating the invention and are not to be construed as limiting the invention in any manner.

*Example 1*

Benzene was employed in a batchwise manner to extract epsilon-caprolactam from 199 grams of a crude aqueous reaction product mixture produced by reaction of epsilon-caprolactone and aqueous ammonia and containing 8.2 percent by weight of epsilon-caprolactam. After six successive batch extractions, carried out at 25° C. using 175 grams of benzene in each instance, analysis of the extracts by vapor phase chromatography showed that 6.2 grams of epsilon-caprolactam, equal to 37.8 weight percent of the total in the reaction product mixture, had been extracted.

*Example 2*

A solution of 20 percent by weight of epsilon-caprolactam in distilled water was prepared and a 70 gram portion thereof subjected to five successive batch extractions at 25° C. utilizing 61 grams of benzene each time. Analysis of the extracts by vapor phase chromatography showed that 6.0 grams of epsilon-caprolactam, equal to 43 weight percent of the total in the solution, had been extracted.

*Example 3*

To 150 grams of a crude aqueous reaction product mixture, produced by reaction of epsilon-caprolactone with aqueous ammonia and containing 7.7 percent weight of epsilon-caprolactam, there were added 600 grams of benzene at 10° C. and the admixture was vigorously agitated. The benzene extract was found to contain 3.3 grams of epsilon-caprolactam, equal to 28.6 weight percent of the total in the reaction product.

A second extraction carried out in an identical manner but at a temperature of 25° C. resulted in the extraction of 5.0 grams of epsilon-caprolactam, equal to 43.3 weight percent of the total in the reaction product.

A third extraction carried out in an identical manner but at a temperature of 50° C. resulted in the extraction of 7.1 grams of epsilon-caprolactam, equal to 61.6 weight percent of the total in the reaction product.

*Example 4*

Each of three 100-gram solutions of epsilon-caprolactam in distilled water, containing 10, 50 and 75 percent by weight of epsilon-caprolactam respectively, were subjected to a single batch extraction with 400 grams of benzene at 25° C. Analysis of the benzene extracts by vapor phase chromatography showed that 4.0 grams of epsilon-caprolactam were extracted from the 10% solution (40 weight percent of the total), 32.5 grams of epsilon-caprolactam were extracted from the 50% solution (65 weight percent of the total), and 66.6 grams of epsilon-caprolactam were extracted from the 75% solution (89 weight percent of the total).

*Example 5*

To the top of a laboratory extraction column having an internal diameter of approximately 2 inches and packed to a depth of 40 inches with 8 x 8 mm. glass Raschig rings there was continuously fed a crude aqueous reaction product mixture, produced by the reaction of epsilon-caprolactone with aqueous ammonia, from which 75 percent by weight of the original water had been removed by evaporation. The crude aqueous reaction product mixture was fed to the extraction column at a rate of 1800 grams per hour and benzene was continuously fed to the base of the extraction column at a rate of 6700 grams per hour. The extraction column was maintained at a temperature of approximately 58° C. and operation was continued for a period of 5½ hours. Analysis of the benzene extract and the aqueous raffinate from the extraction column by vapor phase chromatography showed that approximately 75 weight percent of the epsilon-caprolactam was being extracted from the aqueous reaction product mixture.

*Example 6*

A sample of 199 grams of the crude aqueous reaction product mixture produced by reaction of epsilon-caprolactone and aqueous ammonia and containing 8.2 percent by weight of epsilon-caprolactam was subjected to two successive batch extractions at 25° C. using 87 grams of benzene in each instance. Analysis of the extracts by vapor phase chromatography showed that 1.5 grams of epsilon-caprolactam, equal to 9.2 weight percent of the total in the reaction product mixture, had been extracted.

*Example 7*

An identical sample to that described in Example 6 above was subjected to the same extraction procedure using an equal weight of toluene in place of the benzene and analysis of the extracts showed that 1.1 grams of epsilon-caprolactam, equal to 6.7 weight percent of the total in the reaction product mixture, had been extracted.

*Example 8*

An identical sample to that described in Example 6 above was subjected to the same extraction procedure using an equal weight of xylene in place of the benzene and analysis of the extracts showed that 0.64 gram of epsilon-caprolactam, equal to 3.9 weight percent of the total in the reaction product mixture, had been extracted.

Various changes and modifications can be made in the invention without departing from the spirit and scope thereof and it is accordingly intended to include within the scope of the following claims all such changes and modifications as may be apparent to those skilled in the art from the description and illustrative examples provided herein.

What is claimed is:

1. A method of recovering a purified epsilon-caprolactam from the crude aqueous solution thereof formed in a process for production of an epsilon-caprolactam by ammonolysis of a 6-hydroxycaproic acid derivative in an aqueous medium at superatmospheric pressure and elevated temperature, which method comprises contacting said crude aqueous solution with an aromatic solvent of 6 to 12 carbon atoms of the general formula:

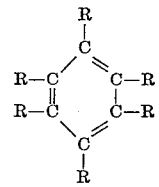

wherein each R is independently selected from the group consisting of hydrogen and lower alkyl radicals of 1 to 4 carbon atoms, and separating the epsilon-caprolactam from said aromatic solvent.

2. The method of claim 1 wherein the epsilon-caprolactam is epsilon-caprolactam.

3. The method of claim 1 wherein the epsilon-caprolactam is an alkyl substituted epsilon-caprolactam.

4. The method of claim 1 wherein the epsilon-caprolactam is an N-alkyl-epsilon-caprolactam.

5. The method of claim 1 wherein the volumetric ratio of aromatic solvent to crude aqueous solution is from about 1 to 1 to about 20 to 1.

6. A method of recovering a purified epsilon-caprolactam from the crude aqueous solution thereof formed in a process for production of an epsilon-caprolactam by ammonolysis of a 6-hydroxycaproic acid derivative in an aqueous medium at superatmospheric pressure and elevated temperature, which method comprises subjecting said crude aqueous solution to continuous countercurrent liquid-liquid extraction with an aromatic solvent of 6 to 12 carbon atoms of the general formula:

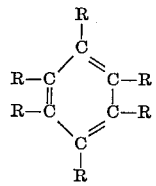

wherein each R is independently selected from the group consisting of hydrogen and lower alkyl radicals of 1 to 4 carbon atoms, and separating the epsilon-caprolactam from said aromatic solvent.

7. The method of claim 6 wherein the volumetric ratio of aromatic solvent to crude aqueous solution is from about 5 to 1 to about 15 to 1.

8. A method of recovering a purified epsilon-caprolactam from the crude aqueous solution thereof formed in a process for production of an epsilon-caprolactam by ammonolysis of a 6-hydroxycaproic acid derivative in an aqueous medium at superatmospheric pressure and elevated temperature, which method comprises subjecting said crude aqueous solution to continuous countercurrent liquid-liquid extraction with benzene and separating the epsilon-caprolactam from the benzene.

9. A method of recovering purified epsilon-caprolactam from the crude aqueous solution thereof produced by reaction of epsilon-caprolactone with aqueous ammonia at superatmospheric pressure and elevated temperature, which method comprises subjecting said crude aqueous solution to continuous countercurrent liquid-liquid extraction with benzene, the volumetric ratio of benzene to said crude aqueous solution being from about 5 to 1 to about 15 to 1, and recovering the epsilon-caprolactam from the benzene.

10. A method of recovering purified epsilon-caprolactam from the crude aqueous solution thereof produced by reaction of epsilon-caprolactone with aqueous ammonia at superatmospheric pressure and elevated temperature, which method comprises subjecting said crude aqueous solution to continuous countercurrent liquid-liquid extraction with toluene, the volumetric ratio of toulene to said crude aqueous solution being from about 5 to 1 to about 15 to 1, and recovering the epsilon-caprolactam from the toluene.

11. A method of recovering purified epsilon-caprolactam from the crude aqueous solution thereof produced by reaction of epsilon-caprolactone with aqueous ammonia at superatmospheric pressure and elevated temperature, which method comprises subjecting said crude aqueous solution to continuous countercurrent liquid-liquid extraction with xylene, the volumetric ratio of xylene to said crude aqueous solution being from about 5 to 1 to about 15 to 1, and recovering the epsilon-caprolactam from the xylene.

References Cited

UNITED STATES PATENTS

| 2,758,991 | 8/1956 | Kretzers et al. | 260—239.3 |
| 2,960,499 | 11/1960 | Boon | 260—239.3 |
| 3,000,877 | 9/1961 | Phillips et al. | 260—239.3 |
| 3,000,878 | 9/1961 | Phillips et al. | 260—239.3 |
| 3,000,879 | 9/1961 | Phillips et al. | 260—239.3 |
| 3,000,880 | 9/1961 | Phillips et al. | 260—239.3 |
| 3,007,921 | 11/1961 | Berther | 260—239.3 |
| 3,016,375 | 1/1962 | Hopkins et al. | 260—239.3 |

JOHN D. RANDOLPH, *Primary Examiner.*

WALTER A. MODANCE, *Examiner.*

R. T. BOND, *Assistant Examiner.*